March 30, 1948. J. T. HOGUE 2,438,667

ANGLE CALCULATOR FOR STRUCTURAL MEMBERS

Filed Oct. 12, 1943 2 Sheets-Sheet 1

INVENTOR.
JAMES T. HOGUE
BY Munn, Liddy & Glaccum
ATTORNEYS

March 30, 1948.   J. T. HOGUE   2,438,667
ANGLE CALCULATOR FOR STRUCTURAL MEMBERS
Filed Oct. 12, 1943   2 Sheets-Sheet 2

INVENTOR.
JAMES T. HOGUE.
BY
Murry, Liddy + Glaccum
ATTORNEYS.

Patented Mar. 30, 1948

2,438,667

UNITED STATES PATENT OFFICE 2,438,667

ANGLE CALCULATOR FOR STRUCTURAL MEMBERS

James T. Hogue, San Francisco, Calif., assignor by decree of court to Lenna M. Hogue Application October 12, 1943, Serial No. 506,001

9 Claims. (Cl. 33—174)

The present invention relates to improvements in an angle calculator for structural members and it consists of the combinations, constructions and arrangements hereinafter decribed and claimed.

An object of my invention is to provide an angle calculator for structural members which has novel means for determining the length of a structural member and the angle at which the ends must be cut in order that the member will fit properly into its designated place. The device in its simple state will enable a skilled or unskilled carpenter to measure and cut jack rafters, octagonal rafters, etc., braces from planes with even or uneven degrees of pitch so often encountered in tunnel construction, pole and lumber bridge construction, shorings in ship construction, temporary repair braces, etc. By a simple additional member the device is readily applicable to round timbers or pipe. For example: in the building of ships, it is necessary that constructional stanchions or other supporting structure be placed between decks and platforms and extend at certain angles. It is difficult to cut the ends of a supporting member so that it will extend at the proper angle and also make the supporting member the required length because the sheer of decks and platforms fore and aft and pitches port and starboard are not constant but variable in contrast with land structures which usually have level bases or floors and vertical walls or partitions.

With my device, novel means is used for determining the angle at which the ends of the supporting member must be cut. The device is placed in the position where the supporting member must be placed in order to determine the length of the member and the angle of the cut ends, and then the device is slipped over or around the material from which the supporting member is to be cut. The device determines where the lines are to be drawn on the supporting member so that cuts made along these lines will provide the supporting member with ends that extend at the required angles and proper length.

A further object of my invention is to provide a device of the type described which is simple in construction and which is adjustable for accommodating supporting members of different sizes and contours. The device is collapsible into a compact unit for transporting.

Other objects and advantages will appear in the following specification, and the novel features of the device will be particularly pointed out in the appended claims.

My invention is illustrated in the accompanying drawing forming a part of this application, in which.

While I have shown only the preferred forms of my invention, it should be understood that various changes or modifications may be made within the scope of the appended claims without departing from the spirit and scope of the invention.

Figure 2:
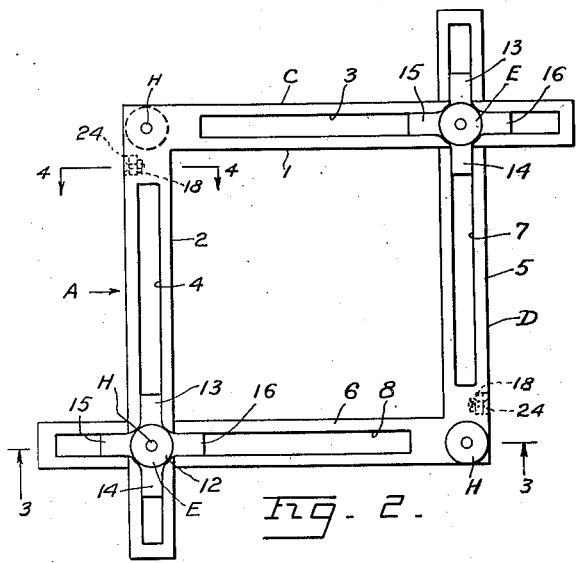
Figure 2 is a plan view of one of the frames used in the device.

In carrying out my invention I provide two adjustable or rigid frames A and B which are identical in construction and therefore a description of frame A will suffice. The adjustable frame is shown in Figure 2 and comprises two right angle arms C and D which also are identical in construction to each other. The arm C has legs 1 and 2 that extend at right angles to each other and are centrally slotted at 3 and 4. In like manner the arm D has legs 5 and 6 that extend at right angles to each other and are contrally slotted at 7 and 8. The legs of the arm C extend over the legs of the arm D, as shown in Figure 2.

Figure 3:
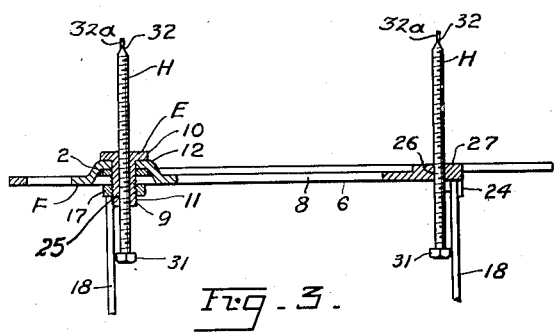
Figure 3 is a section along the line 3—3 of Figure 2.

The two arms are adjustably held together by lock nuts E shown in Figures 2 and 3. The lock nut E has a cylindrical portion 9 and a head 10. The cylinder 9 is externally threaded at 11 and is passed through a cross-shaped clamp F. The clamp has a body portion 12 against which the head 10 rests and the legs of the clamp are curved downwardly to enter the slots 4 and 8 in the two legs 2 and 6 respectively. The legs 13 and 14 of the clamp ride in the slot 4 while the legs 15 and 16 ride in the slot 8. The other lock nut E has its legs 13 and 14 riding in the slot 7 and the other pair of legs 15 and 16 riding in the slot 3. Figure 3 shows the leg 2 of the arm C extending between the clamp F and the leg 6 of the arm D. The two legs 2 and 6 are adjustably secured together by a nut 17 that is threaded upon the cylindrical portion 9 and clamps the pair of legs together.

Figure 1:
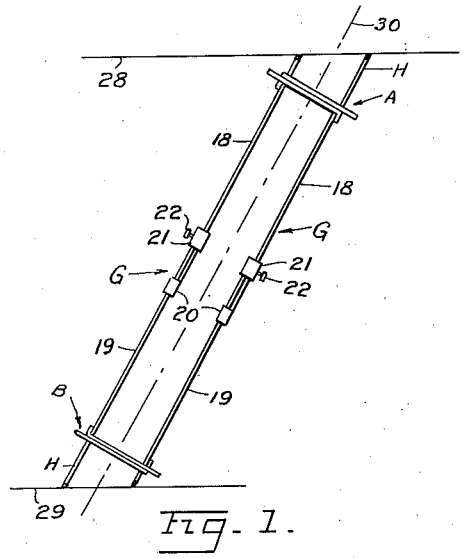
Figure 1 is a side elevation of the device showing it operatively applied between two planes.
Figure 4:
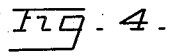
Figure 4 is a sectional view taken substantially along the line 4—4 of Figure 2.

The frames A and B are adjustably connected together by extension members indicated generally at G in Figure 1. One or more pair of extension members may be used and I have shown two in the present form of the device. Each pair consists of a bar 18 and a bar 19. The bar 18 has its end provided with an integral guide 20 that slidably receives the bar 19. A clamping sleeve 21 carries a set screw 22 by means of which the two bars are adjustably secured together, see Figure 4. The bar 18 is secured to the frame A by bolts 23 passed through a lug 24 that is integral with the arm C. The bar 19 is secured to the frame B in like manner.

Each frame carries four measuring screws H. Two of these screws are passed through threaded bores 25 formed in the cylindrical portions 9, see Figure 3 and the other two screws are passed through threaded bores 26 formed at the corners of the arms C and D. The thickness of the arms adjacent to the threaded openings 26 is increased by projections 27 that are integral with the arms.

From the foregoing description of the various parts of the device, the operation thereof may be readily understood.

In Figure 1, I indicate two spaced surfaces 28 and 29 (which may be the decks of a ship) that are to receive a stanchion or a support that is to be inclined at the angle indicated by the broken lines 30. The line 30 indicates the center line of the support. The problem is to measure the length of the portion of the line 30 extending between the two planes 28 and 29 and to determine the angle these planes make with respect to the center line 30.

The device is placed between the surfaces 28 and 29, as indicatd in Figure 1 and the two frames A and B are moved away from each other until the frame A is placed close to the surface 28 and the frame B is placed close to the surface 29. The set screws 22 are now locked in position to hold the frames against collapsing. The two frames A and B are now centered with respect to the line 30 and the measuring screws H are rotated by means of their heads 31, see Figure 3, so that the screws will have their pointed ends 32 contact with the surfaces 28 and 29. It will be seen from this that the pointed ends 32 of the screws H on the frame A will define a plane coinciding with the surface 28 and in like manner the screws H carried by the frame B will have their pointed ends 32 define a plane coinciding with the surface 29.

Figure 5:
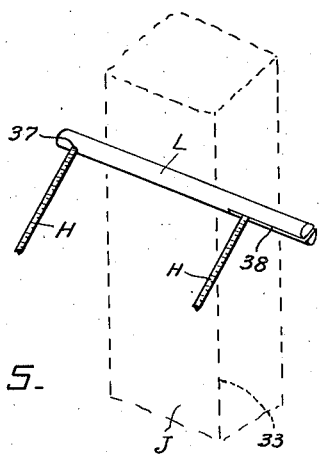
Figure 5 is a perspective view of a fence used with the device.

The device is now removed from the position shown in Figure 1 and is telescoped over the member J, see Figure 5, that is to constitute the support or stanchion. The frames A and B have been made large enough to telescope over the member J. The member J is longer than that required and the pointed ends 32 of the screws H will be positioned at the corners 33 of the member so that lines drawn on the member and extending between the pointed ends will determine the angle of the cut that must be made in the member. Both ends of the member are cut at angles determined by the measuring screws and in this simple way the length of the member and the proper angles of the member ends are accurately determined. After the member has been cut, it can be placed between the surfaces 28 and 29 so that its center will correspond with the center line 30. If the member is made of metal and the surfaces 28 and 29 are also of metal as in ship construction, the member may be welded in place.

Figure 6:
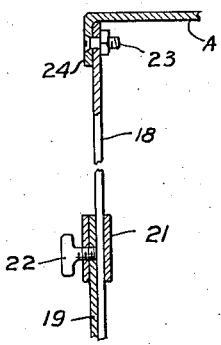
Figure 6 is a modified form of fence used when measuring cylindrical stanchions or other supporting members.

Should the supporting member be circular rather than rectangular in cross section, a circular fence or scribing ring indicated at K in Figure 6, is used. The fence is in the shape of a ring and has its inner periphery made slightly larger in diameter than the outer diameter of the supporting member to be cut. The fence has diametrically opposed recesses 35 for receiving two of the pointed ends 32 of the measuring screws H. Slotted arms 36 are placed 90° away from the recesses 35 and receive the other two screw ends. The fence K can rock on the two screw ends that are received in the recesses 35 until the other two screw ends are both received in the slotted arms 36. The fence K will now extend at the proper angle with respect to the support and the portion of the support that extend through the fence can be marked, using the fence ring as a guide. When the support is cut along the marked line, the cut end will extend at the proper angle.

In case it is desired to have one support contact another support M of the same cross-sectional measurement (see Figure 7) rather than engage with a surface, I provide two elongated rod-like fences L, shown in Figure 5. The measuring screws H instead of contacting with the surface 28 for example, will be received in a recess 37 in the rod L and in a slot 38 in the same rod. The pointed ends 32 extend entirely through the diameter of the rod so that when the rod or fence contacts with the member M against which the support is to rest, the rod will determine one cutting line on the member which is to be cut. In actual practice two rods L are used at each end of the device and each pair of rods determine the angle of the plane at which the cut end must extend with respect to the axis of the support.

Figure 7:
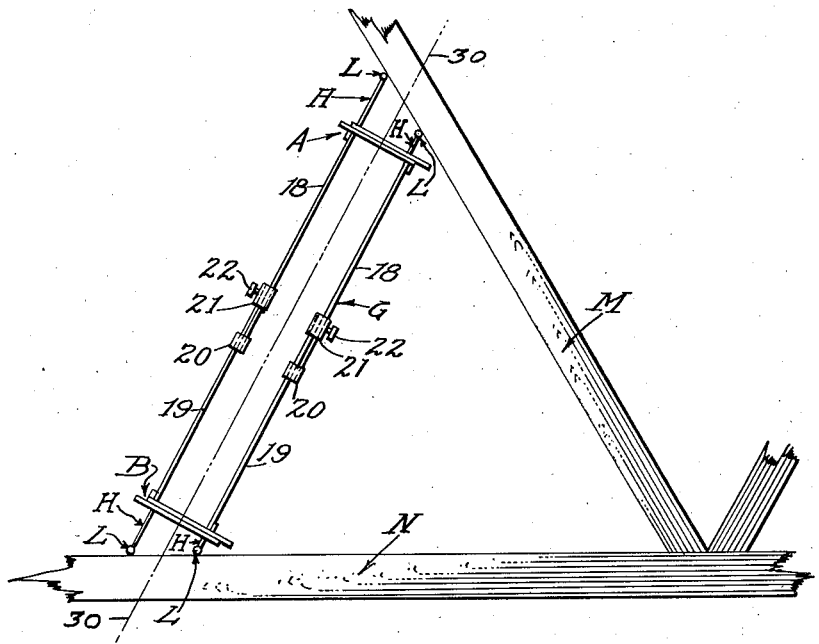
Figure 7 is a view showing the fence of Figure 5 used with the device.
Figure 8:
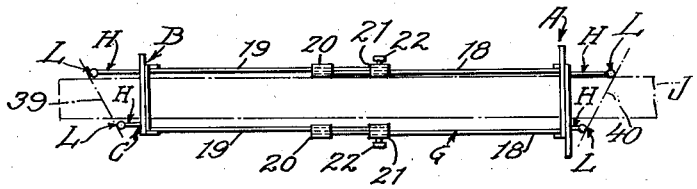
Figure 8 shows the device with the fence of Figure 5 being used in marking a structural member.

In Figure 7, I show the device placed between a support M and a girder N. The pairs of screws H have the fences L contacting the support and girder. The line 30 indicates the center line of the member J that will be placed in position between the support and girder. After the screws H have been adjusted to bring the fence L into contact with the support and girder, the device is removed and slipped over the member J as shown in Figure 8. Lines 39 and 40 are drawn on the member between the fences L as shown and these lines will indicate the angle of cut to make on the member J.

The device enables anyone to lay out, measure and cut rafters, braces, constructional stanchions, etc., from the simple type to the most complicated without the use of the rule or the steel square. The operator need memorize no rules. With the device, it is possible to cut a brace to extend from a plane surface above of any conceivable pitch to a plane surface at the base of any conceivable pitch. It is practically impossible when using only a steel square, to solve complicated pitches or angles by formulas and computations. With my device, figuring is not necessary.

The measuring screws H will have needle-like extensions 32a projecting beyond the pointed ends 32. These extensions will be long enough to extend through the openings 35 in the ring K. The extensions 32a will be loosely received in the openings 35 so that the ring K may pivot on the needle points into the desired angular position.

It is possible to use the frame A by itself and in this case additional lock nuts E may be spaced along any of the slots 3, 4, 7 and 8 and the measuring screws H carried by the auxiliary lock nuts be adjusted independently of each other to contact with a curved surface instead of a flat one. By using auxiliary measuring screws H and their lock nuts E, it is possible to adapt the device to measure the surface of a plane having an irregular top.

I claim:

1. An angle calculator comprising a pair of adjustable rectangular frames, adjustable extensions connecting the two frames together, said frames having central openings for receiving a structural member that is to be marked for cutting, and measuring screws placed at the corners of the frames and adapted to be adjusted to contact with surfaces against which the ends of the structural member are to abut, the ends of said screws indicating on the structural member when the member is received in the frames, the place for cutting the member and the angle of cut.

2. An angle calculator comprising a pair of adjustable rectangular frames, each consisting of two angle-shaped members, adjustable means for securing the members together in adjusted position for providing a rectangular opening of the desired size, adjustable extensions connecting the two frames together, said rectangular openings being adapted to receive a structural member that is to be marked for cutting, and measuring screws placed at the corners of the frames and adapted to be adjusted to contact with surfaces against which the ends of the structural member are to abut, the ends of said screws indicating on the structural member when the member is received in the frames, the place for cutting the member and the angle of cut.

3. In an angle calculator, an adjustable rectangular frame comprising two angle-shaped members, each having slotted legs extending at right angles to each other, bolts connecting the legs together and being adjustable to vary the size of the opening formed by the members, measuring screws received in threaded bores provided in the bolts, and additional measuring screws received in the corner of each angle member.

4. An angle calculator comprising a pair of adjustable rectangular frames, lugs placed at opposite corners of the frames, adjustable extensions connected to the lugs for adjustably connecting the two frames together as a unit so that the frames can receive a structural member that is long enough to project beyond both frames, and measuring screws placed at the corners of the frames and adapted to be adjusted to contact with surfaces against which the ends of the cut structural member are to abut.

5. In an angle calculator for structural members, a rectangular adjustable frame having a central opening adapted to receive the structural member that is to have an end marked for cutting, measuring screws placed at the corners of the frame and having pointed ends and a fence consisting of a rod with a transverse opening at one end for receiving the pointed end of one of the measuring screws and having a longitudinally extending slot at the other end for receiving the pointed end of an adjacent screw.

6. In an angle calculator for structural members, a rectangular adjustable frame having slots in its four sides, measuring screws placed at two opposite corners of the frame, and two auxiliary measuring screws adjustably mounted in the slots.

7. In an angle calculator for structural members, a rectangular adjustable frame, measuring screws placed at the corners of the frame and having pointed ends with needle-like extensions, the axes of the screws extending at right angles to the plane of the frame.

8. An angle calculator comprising a pair of frames adapted to encircle at least a portion of a structural member at two spaced points along the length of the member, at least one extension connecting the two frames together so that spaced frames will extend transversely with respect to the structural member, and measuring screws carried by the frames and extending in the direction of the length of the member, the ends of said screws indicating on the structural member the places for cutting the member and the angles of the cut.

9. An angle calculator comprising a pair of frames adapted to encircle at least a portion of a structural member at two spaced points along the length of the members, at least one extension connecting the two frames together so that the spaced frames will extend transversely with respect to the structural member, measuring screws carried by the frames and extending in the direction of the length of the member, and a fence interconnecting the outer ends of certain of the screws in each frame and constituting a guide rule for a marking instrument that may mark the member received in the frames to indicate the place for cutting the member and the angle of cut.

JAMES T. HOGUE.

REFERENCES CITED

The following references are of record in the file of this patent:

UNITED STATES PATENTS

| Number | Name | Date |
|---|---|---|
| 250,835 | Osenburg | Dec. 13, 1881 |
| 776,713 | Wurts | Dec. 6, 1904 |
| 941,297 | Barthelimes | Nov. 23, 1909 |
| 1,135,089 | Wilks | Apr. 13, 1915 |
| 2,334,385 | Cooper | Nov. 16, 1943 |